Nov. 20, 1962    H. MacDONALD DAVIS ETAL    3,065,410
CATHODE RAY POLAROGRAPH
Filed July 8, 1960    3 Sheets-Sheet 1
FIG.1.
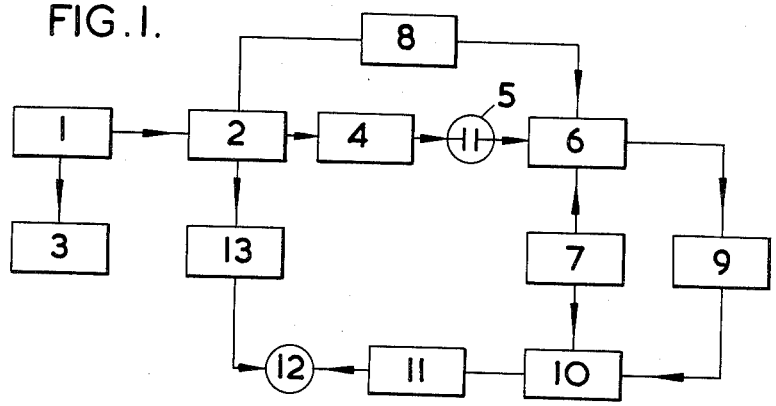
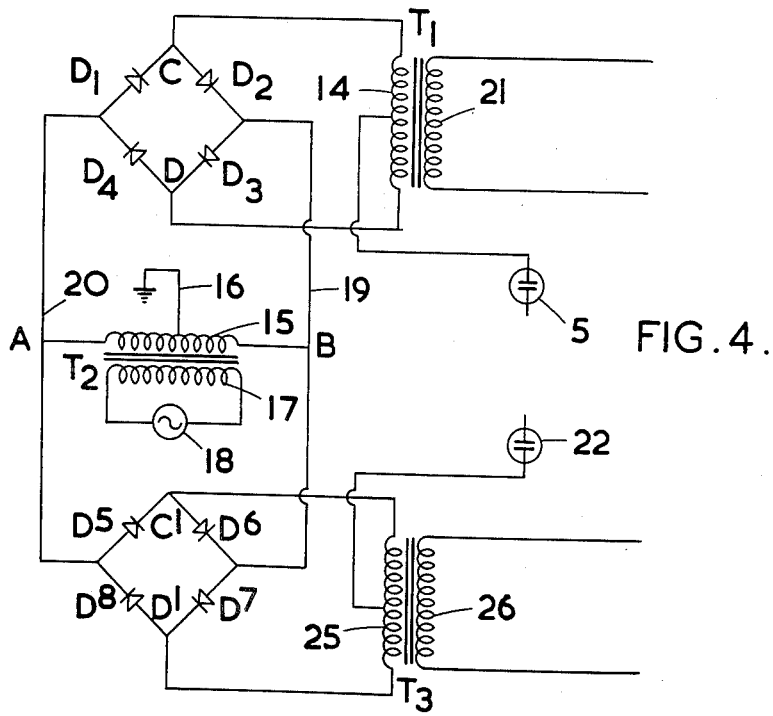
FIG.4.
INVENTORS
Herbert MacDonald Davis
Joyce Elizabeth Seaborn
BY
Lawson and Taylor Nov. 20, 1962   H. MacDONALD DAVIS ETAL   3,065,410
CATHODE RAY POLAROGRAPH
Filed July 8, 1960   3 Sheets-Sheet 2

INVENTORS
Herbert MacDonald Davis
Joyce Elizabeth Seaborn
BY
Larson and Taylor

Nov. 20, 1962   H. MacDONALD DAVIS ETAL   3,065,410
CATHODE RAY POLAROGRAPH
Filed July 8, 1960   3 Sheets-Sheet 3

INVENTORS
Herbert MacDonald Davis
Joyce Elizabeth Seaborn
BY
Larson and Taylor

United States Patent Office 3,065,410
Patented Nov. 20, 1962

3,065,410
CATHODE RAY POLAROGRAPH
Herbert MacDonald Davis, Barnehurst, Kent, and Joyce Elizabeth Seaborn, Kennington, London, England, assignors to United Kingdom Atomic Energy Authority, London, England
Filed July 8, 1960, Ser. No. 41,648
Claims priority, application Great Britain July 10, 1959
5 Claims. (Cl. 324—31)

This invention relates to polarograph apparatus of the kind in which a potential rising linearly with time is applied to the polarograph cell late in the life of each mercury drop and the ratio of the resulting cell current to the voltage applied to the cell at a series of points in time is recorded. The cycle of events takes place in quiescent and sweep periods defined by a multivibrator. In the quiescent period a new drop is growing and at the end of the sweep period a pulse is fed to a mechanism which causes the drop to fall.

Since a polarograph cell requires D.C. the amplifiers previously used have been D.C. amplifiers with their accompanying relatively large power requirements and tendency to drift. The highly stable power supplies needed for D.C. amplifiers have also necessitated the use of rather large power packs.

An object of the invention is to provide a polarograph apparatus which uses A.C. amplifiers, thus making it possible to provide polarograph apparatus no larger than a conventional laboratory oscilloscope.

A second object of the invention is to provide a polarograph apparatus capable of measuring the very small differences in current between two polarographic cells as a function of the voltage applied to them.

The invention comprises polarograph apparatus having means for amplifying the D.C. current in the polarograph cell, said amplifying means comprising means for switching said current alternately through each half of the centre-tapped primary winding of a first transformer, an A.C. amplifier having its input connected to the secondary winding of the first transformer, and phase-sensitive means for rectifying the output of the A.C. amplifier.

In the apparatus according to the invention it is preferred to record the ratio of the resulting cell current to the voltage applied in the form of a graph of cell current as a function of voltage applied, on the screen of a cathode ray tube.

The switching means may be mechanical, electromechanical or electrical. In a preferred form of the invention it comprises a ring of four diodes connected in series to conduct in the same direction round the ring, a second transformer having its secondary earthed by a centre tap and connected across opposite points of the ring, and leads for connecting the remaining two opposite points of the ring across the first transformer primary. In this form of the invention, alternate half cycles of a switching wave form fed into the primary of the second transformer cause the switching of the cell current alternately through each half of the transformer primary.

In a further preferred form of the invention a second polarographic cell is provided to act as a reference cell. The output of the second cell is modulated in anti-phase to that of the first cell and the two outputs are combined in a circuit whose output is proportional to the difference between them. The output of the second cell may be passed to a primary of a third transformer or it may be passed to a second primary of the first transformer.

In particular, the invention provides a polarograph apparatus for measuring very small differences between the currents in two polarograph cells as a function of the voltage applied to them. Such an apparatus is known as a differential polarograph. The theoretical advantages of such apparatus have been known for some years, but it has proved very difficult in practice to produce a reliable instrument of the required precision. One major difficulty has been to provide a low-drift system for amplifying the small difference between the currents in the two cells.

According to the present invention a differential polarograph comprises two polarograph cells and means for amplifying the difference between the currents in the two cells.

The two centre-tapped primary windings may be on a single transformer, and the secondary winding means may be a single secondary winding on the single transformer.

The invention will be described by way of example with reference to the accompanying drawings in which:

FIG. 1 is a schematic circuit diagram of a non-differential polarograph using a diode-ring modulator.

FIGS. 4 and 5 are detailed circuit diagrams of alternative forms of modulator used in the circuit of FIG. 3.

Figure 2:
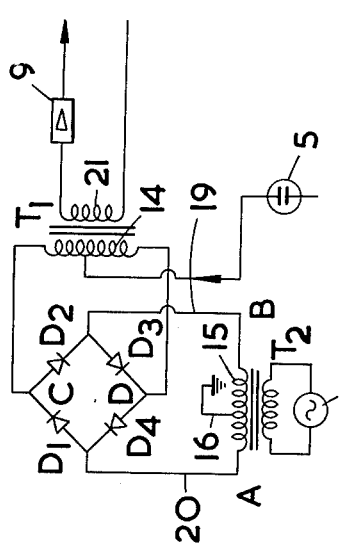
FIG. 2 is a detailed circuit diagram of the modulator of the circuit shown in FIG. 1.

In FIGURE 1 there is shown a multivibrator 1 having unequal metastable states. The multivibrator 1 controls a linear sweep generator 2 in such a way that the generator 2 has a quiescent period (generally about 5 seconds) while the mercury drop is growing and a sweep period (generally about 2 seconds) during which period a linearly rising potential is applied to the drop. At the end of the sweep period multivibrator 1 feeds a pulse to a drop synchroniser 3 which causes the drop to fall. The linearly rising potential is applied via a sweep amplifier 4 to a polarographic cell 5. The function of the sweep amplifier 4 is to maintain a substantially constant rate of change of potential across the terminals of the cell 5 and the modulator 6. The output from the cell 5 is passed to a modulator 6 driven by an oscillator 7. A compensating circuit 8 is included in the circuit and feeds a current into modulator 6 to compensate wholly or in part the capacity effect of drop growth in cell 5 on the current.

The voltage developed at the output terminals of modulator 6 is applied to the input of the A.C. section of the Y amplifier 9. The output of amplifier 9 is phase sensitively rectified by rectifier 10, further amplified in D.C. amplifier 11 and fed to the Y plates of the cathode ray tube 12. The output voltage of the amplifier 11 is so large that drift is insignificant.

The X plates reflection is provided directly from sweep generator 2 via a deflection amplifier 13.

Details of the modulator 6 in FIGURE 1 are shown in FIGURE 2. In FIGURE 2 diodes $D_1$, $D_2$, $D_3$, and $D_4$ are connected in series in a ring to conduct in the same direction round the ring. Points C and D are connected to a first primary 14 of transformer $T_1$. Polarographic cell 5 has a centre tap connection to primary 14. A second transformer $T_2$ has its secondary 15 earthed by a centre tap 16 and its primary 17 connected to an A.C. source 18 for supplying a switching wave form. Secondary 15 is connected by leads 19 and 20 to the remaining two points of the ring of diodes. Secondary 21 of transformer $T_1$ leads to a Y amplifier 9.

Figure 3:
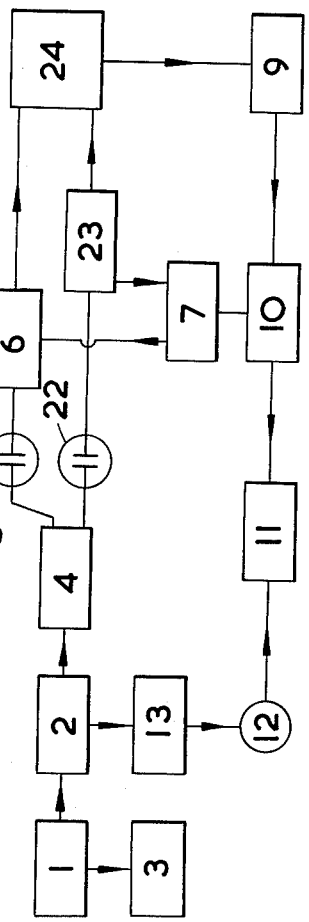
FIG. 3 is a schematic circuit diagram of a differential polarograph according to the present invention.

In FIGURE 3 the integers 1 to 13 have the same signification as in FIGURE 1. (Compensator 8 is of course now unnecessary.) A second polarographic cell 22 is connected to the sweep amplifier 4 and its output is passed to a second modulator 23, which produces a wave-form in antiphase to that produced by modulator 6. The two outputs are combined in a differential amplifier 24 having an output proportional to the difference between the outputs of modulators 6 and 23. The output of the differential amplifier 24 is fed to the Y amplifier 9 in a manner similar to that shown in FIGURE 1.

In FIGURE 4 integers $T_1$, $T_2$, $D_1$, $D_2$, $D_3$, $D_4$, 5, 9 and 14 to 21 have the same signification as in FIGURE 2. A second polarographic cell 22 is connected to a centre tap in a primary 25 of transformer $T_3$. Diodes $D_5$, $D_6$, $D_7$, and $D_8$ are connected in series in a ring to conduct in the same direction round the ring. Points C' and D' are connected to primary 25 and the remaining two points of the ring are connected to secondary 15 of transformer $T_2$ by leads 19 and 20.

The circuit shown in FIGURE 2 operates as follows:

A.C. source 18 provides a switching wave form to transformer $T_2$. Points A and B go positive and negative in alternate half cycles of the switching wave form. When A is positive and B negative, diodes $D_1$ and $D_2$ conduct and diodes $D_3$ and $D_4$ are cut off. Thus point C is a low impedance point at earth potential and point D is a high impedance point. The resulting cell current from polarographic cell 5 therefore flows through the upper half of primary 14 to point C. The current fluctuation in primary 14 produces an A.C. wave form in secondary 21 for amplification by the Y amplifier 9.

In the other half cycle of the switching wave form provided by A.C. source 18, point C becomes a high impedance point and point D becomes a low impedance point at earth potential thus causing the resulting cell current from polarographic cell 5 to be switched through the lower half of primary 14.

The circuit in FIGURE 4 operates as follows:

Points D and D' become high impedance points in one half cycle of the switching wave form provided by A.C. source 18 thus causing the resulting cell currents from polarographic cells 5 and 22 to be switched through primaries 14 and 25 of transformers $T_1$ and $T_3$ respectively. In the other half cycle of the switching wave form points C and C' become high impedance points at the same time. The resulting wave forms in secondaries 21 and 26 of transformers $T_1$ and $T_3$, due to fluctuations in the transformer primaries 14 and 25, are arranged to be in antiphase and cancel each other so long as the resulting cell currents from polarographic cells 5 and 22 are equal.

Figure 5:
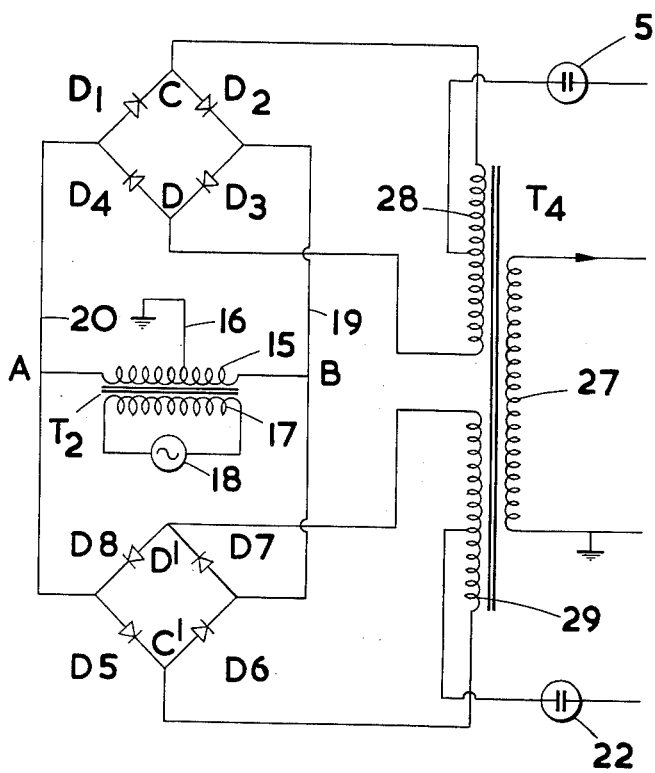

In FIGURE 5 integers 5, 14 to 20 inclusive, and 22 and letters $D_1$, $D_2$, $D_3$, $D_4$, C, D, A, B, and $T_2$ have the same signification as in FIGURE 4. $D_5$, $D_6$, $D_7$, $D_8$, C' and D' have the same signification as in FIGURE 4, but the diode ring to which they refer is arranged to conduct in the reverse direction to the equivalent diode ring in FIGURE 4. Transformer $T_4$, replacing transformers $T_1$ and $T_3$ of FIGURE 4, has two centre-tapped primaries 28 and 29 and one secondary 27.

The circuit operates in the same way as that shown in FIGURE 4, the primaries 28 and 29 taking the place of the primaries 14 and 25 respectively, except that the current induced in secondary 27 is directly related to the difference in currents in primaries 28 and 29.

We claim:

1. A differential polarograph having two polarograph cells and means for amplifying the difference between the currents in the two cells, said amplifying means comprising a centre-tapped transformer primary winding associated with each cell, a ring of four diodes associated with each primary winding, the diodes in each ring being connected in series to conduct round the ring and each centre-tapped transformer primary winding being connected across opposite points of its associated ring, a transformer having a centre-tapped secondary winding connected across the remaining opposite points of both diode rings and having its primary winding connected to an A.C. source, secondary winding means of said first mentioned centre-tapped transformers for deriving an A.C. signal proportional to the difference between the currents in the two centre-tapped primary windings, an A.C. amplifier having its input connected to said secondary winding means, and phase-sensitive means for rectifying the output of the A.C. amplifier.

2. The differential polarograph of claim 1 wherein said secondary winding means are separate and distinct for each respective first-mentioned centre-tapped transformers.

3. The differential polarograph of claim 1 wherein said secondary winding means are common to said first-mentioned centre-tapped transformers.

4. A differential polarograph as claimed in claim 1 wherein said centre tapped primary windings are on a single transformer, said secondary winding means being a single secondary winding on said single transformer.

5. A polarograph apparatus having means for amplifying the D.C. current in the polarograph cell, said amplifying means comprising a centre-tapped transformer primary winding having its centre-tapped connection receiving a D.C. signal from said polarograph cell, a ring of four diodes connected with the ends of the primary winding, two of said diodes being connected in series between each end of the primary, said diodes in said ring being polaritey connected to conduct around the ring in a predetermined direction and said primary winding being thereby connected across opposite points of the ring, another transformer having a centre-tapped secondary winding connected across the remaining opposite points of said ring and having its primary winding connected to an A.C. source, secondary winding means of said first-mentioned centre-tapped transformer for deriving an A.C. signal proportional to the currents in said centre-tapped primary winding, an A.C. amplifier having its input connected to said secondary winding means, and phase-sensitive means for rectifying the output of the A.C. amplifier.

References Cited in the file of this patent

UNITED STATES PATENTS

| 2,774,932 | Patton | Dec. 18, 1956 |
| 2,879,469 | Engel et al. | Mar. 24, 1959 |
| 2,911,597 | Lehnam | Nov. 3, 1959 |

FOREIGN PATENTS

| 640,768 | Great Britain | July 26, 1950 |